Patented Oct. 28, 1947

2,429,600

UNITED STATES PATENT OFFICE 2,429,600

CHROMABLE MONOAZO PYRAZOLONE DYE

Walter Francis Beech and Mordecai Mendoza, Blackley, Manchester, England, assignors to Imperial Chemical Industries Limited, a corporation of Great Britain No Drawing. Application August 25, 1943, Serial No. 499,998. In Great Britain September 18, 1942

1 Claim. (Cl. 260—163)

The present invention relates to the manufacture of new monoazo dyestuffs, and more particularly to the manufacture of chromable monoazo wool dyestuffs especially suitable for dyeing by the meta-chrome process.

The meta-chrome or chromate process of dyeing is that wherein a mordant dyestuff is employed in a single bath simultaneously with the chrome mordant, e. g., sodium or potassium bichromate, being thus distinguished from the older processes of dyeing with mordant dyestuffs in which the operations of dyeing and mordanting are effected separately. The meta-chrome or chromate process of dyeing is accordingly also known as the single bath process. This process in which the dyeing and mordanting may be regarded as occurring simultaneously offers great advantages in economy of time, machinery and materials over the older processes just referred to. The use of the meta-chrome or single bath process is, however, attended by the disadvantage that mordant dyestuffs when applied in this way often tend to give poorer colour values or weaker shades for a given quantity of dyestuff than when the mordanting is carried out separately from the dyeing. The present dyestuffs have been designed to overcome this disadvantage, that is to say, to be capable of yielding shades of good strength by the meta-chrome process.

According to the present invention new chromable monoazo wool dyestuffs are manufactured by coupling diazotised o-amino-phenol and -naphthol monosulphonic acids, which may carry simple substituents such as halogen and nitro, with a 1-(diphenylyl or phenoxyphenyl)-3-(methyl or phenyl)-5-pyrazolone wherein the phenyl groups may carry as substituents halogen, alkyl or alkoxy.

As o-amino-phenol and -naphthol monosulphonic acids there may be employed, for example, in accordance with this invention, 2-aminophenol-4-sulphonic acid, 2-aminophenol-6-sulphonic acid, 6-chloro-2-aminophenol-4-sulphonic acid, 4-chloro-2-aminophenol-6-sulphonic acid, 4-nitro-2-aminophenol-6-sulphonic acid, 6-nitro-2-aminophenol-4-sulphonic acid and 1-amino-2-naphthol-4-sulphonic acid.

By way of a 1-(diphenylyl or phenoxyphenyl)-3-(methyl- or phenyl)-5-pyrazolone there can be used in this invention, for instance, 1-p-diphenylyl-3-phenyl-5-pyrazolone, 1-o-diphenylyl-3-methyl-5-pyrazolone, 1-p-phenoxyphenyl-3-methyl-5-pyrazolone, 1-(p-2'-chlorophenoxyphenyl)-3-methyl-5-pyrazolone, 1-(p-4'-chlorophenoxyphenyl)-3-methyl-5-pyrazolone and 1-m-phenoxyphenyl-3-methyl-5-pyrazolone.

The new dyestuffs of the present invention are eminently suitable for application by the meta-chrome process and yield strong dyeings of good fastness to washing, milling, potting and light, which dyeings are obtainable in shades ranging from orange-brown to bluish red.

The following examples, in which the parts are by weight, illustrate but are not intended to limit the invention.

Example 1

6.24 parts of 1-p-diphenylyl-3-phenyl-5-pyrazolone (prepared as described below) are dissolved in 100 parts of hot water by the addition of sufficient 31.7% aqueous sodium hydroxide to make the solution just alkaline to Clayton Yellow paper. 8 parts of anhydrous sodium carbonate are added. The solution is cooled to 5-10° C. 4.47 parts of 6-chloro-2-aminophenol-4-sulphonic acid are stirred with 60 parts of water and diazotised by the addition of 5 parts of 36% hydrochloric acid followed by 1.4 parts of sodium nitrite dissolved in 10 parts of water. The diazo solution so obtained is allowed to run into the solution of the pyrazolone during 10 minutes. The mixture is stirred for 15 hours and the new dyestuff filtered off and dried at 50° C.

The new dyestuff dyes wool by the chromate process in orange-brown shades of excellent fastness to washing, milling, potting and light.

The 1-p-diphenylyl-3-phenyl-5-pyrazolone employed above is obtainable by condensing 4-hydrazinodiphenyl with ethyl benzoylacetate in hot ethanol.

Example 2

5 parts of 1-o-diphenylyl-3-methyl-5-pyrazolone (obtainable by condensing ethylacetoacetate with 2-hydrazino-diphenyl) are dissolved in 100 parts of hot water, by the addition of sufficient 31.7% aqueous sodium hydroxide to make the solution alkaline to Clayton Yellow paper. 8 parts of anhydrous sodium carbonate are added. The solution is cooled to 5-10° C. 4.68 parts of 6-nitro-2-aminophenol-4-sulphonic acid are stirred in 60 parts of water and diazotised by the addition of 5 parts of 36% hydrochloric acid and 1.4 parts of sodium nitrite in 10 parts of water. The resulting diazo solution is suffered to run into the above pyrazolone solution during 10 minutes. After the mixture has been stirred for 15 hours, 25 parts of sodium chloride are added to effect complete separation of the new dyestuff. The latter is filtered off and dried at 50° C.

The new dyestuff dyes wool by the meta-chrome process in orange-brown shades; the dyeings possess excellent fastness to washing, milling, potting and light.

*Example 3*

5.32 parts of 1-p-phenoxyphenyl-3-methyl-5-pyrazolone obtainable as described below, are dissolved in 75 parts of hot water, by the addition of 31.5% aqueous sodium hydroxide to make the solution faintly alkaline to Clayton Yellow paper. 8 parts of anhydrous sodium carbonate are added. The solution is then cooled to 5–10° C. and to the cooled solution is added a solution of diazotised 4-chloro-2-aminophenol-6-sulphonic acid which has been made from 4.47 parts of 4-chloro-2-aminophenol-6-sulphonic acid by the same procedure as is described in Example 1 for 6-chloro-2-aminophenol-4-sulphonic acid. The mixture is stirred for 15 hours. The new dyestuff is filtered off and dried at 50° C.

When applied to wool by the meta-chrome process, the new dyestuff yields red shades of excellent fastness to washing, milling, potting and light.

The 1-p-phenoxyphenyl-3-methyl-5-pyrazolone employed above is obtained by diazotising 4-amino-diphenyl ether, converting to the diazosulphonate (also referred to as the diazonium sulphonate) with sodium sulphite, reducing with zinc dust and glacial acetic acid to the corresponding hydrazino-β-sulphonic acid, which is then converted by the action of hydrochloric acid to 4-hydrazinodiphenyl ether and the latter condensed with acetoacetic ester.

*Example 4*

6.01 parts of 1-(p-2'-chlorophenoxyphenyl)-3-methyl-5-pyrazolone, obtainable from 2-chloro-4'-aminodiphenyl ether by a similar process to that described in respect of 1-p-phenoxyphenyl-3-methyl-5-pyrazolone in the previous example, are dissolved in 100 parts of hot water by the addition of sufficient 31.7% aqueous sodium hydroxide to make the solution faintly alkaline to Clayton Yellow paper. 1 part of anhydrous sodium carbonate is added. The solution is cooled to 5–10° C. To this cooled solution there is then added a solution of the diazo compound of 1-amino-2-naphthol-4-sulphonic acid, the latter solution having been prepared by stirring 5 parts of the diazo oxide derived from 1-amino-2-naphthol-4-sulphonic acid with 50 parts of water and sufficient sodium bicarbonate to remove acidity to Congo red paper. The mixture is stirred for 15 hours. The new dye-stuff is then filtered off and dried at 50° C. This dyestuff yields bright bordeaux shades on wool when applied by the meta-chrome process. The dyeings thus produced possess excellent fastness to washing, milling, potting and light.

*Example 5*

6.01 parts of 1-(p-4'-chlorophenoxyphenyl)-3-methyl-5-pyrazolone, obtainable from 4-chloro-4'-aminodiphenyl ether by a similar process to that described in Example 4 for 1-(p-2'-chlorophenoxyphenyl)-3-methyl-5-pyrazolone, are dissolved in 100 parts of hot water by the addition of sufficient 31.7% sodium hydroxide to make the solution faintly alkaline to Clayton Yellow paper. 8 parts of anhydrous sodium carbonate are added. The solution is then cooled to 5–10° C. 4.68 parts of 4-nitro-2-aminophenol-6-sulphonic acid are diazotised in 60 parts of water by the addition of 5 parts of 36% hydrochloric acid and 1.4 parts of sodium nitrite dissolved in 10 parts of water. The resulting diazo solution is then suffered to run into the above pyrazolone solution during 10 minutes. The mixture is stirred for 15 hours. The new dyestuff is then filtered off and dried at 50° C.

When wool is dyed by this dyestuff by use of the meta-chrome process, reddish-orange shades are obtained which exhibit excellent fastness in respect of washing, milling, potting and light.

*Example 6*

6.56 parts of 1-m-phenoxyphenyl-3-phenyl-5-pyrazolone, obtainable from 3-aminodiphenyl ether by a similar process to that described in Example 3 in respect of 1-p-phenoxyphenyl-3-methyl-5-pyrazolone, are dissolved in 100 parts of hot water by the addition of sufficient 31.7% aqueous sodium hydroxide to make the solution just alkaline to Clayton Yellow paper. 8 parts of anhydrous sodium carbonate are added. The solution is then cooled to 5–10° C. A diazo solution prepared from 4.68 parts of 4-nitro-2-aminophenol-6-sulphonic acid in the manner described in the previous example is allowed to run into the above pyrazolone solution during 10 minutes. The mixture is stirred for 15 hours and the new dyestuff filtered off and dried at 50° C. This dyestuff, when applied to wool by the meta-chrome process, yields yellowish brown shades of excellent fastness to washing, milling, potting and light.

*Example 7*

A diazo solution is prepared by agitating 4.68 parts of 6-nitro-2-aminophenol-4-sulphonic acid with 60 parts of water and 5 parts of 36% hydrochloric acid and subsequently adding a solution of 1.4 parts of sodium nitrite in 10 parts of water, the temperature being controlled at 5° C. 5 parts of 1-p-diphenylyl-3-methyl-5-pyrazolone are dissolved in 100 parts of water containing sufficient sodium hydroxide to render the resulting solution just alkaline to Clayton Yellow. To the pyrazolone solution 8 parts of soda ash are added. The above diazo solution is then let run into this pyrazolone solution during 10 minutes. After being stirred for 15 hours, the new dyestuff is filtered off and dried at 50° C. It dyes wool by the meta-chrome process in orange-brown shades of excellent fastness to washing, milling, potting and light.

*Example 8*

4.68 parts of 6-nitro-2-aminophenol-4-sulphonic acid are stirred with 60 parts of water and 5 parts of 36% hydrochloric acid. A solution of 1.4 parts of sodium nitrite in 10 parts of water is then allowed to run in, the temperature being kept at 5° C. The resulting diazo solution is introduced during 10 minutes into a solution of 6.01 parts of 1-(p-4'-chlorophenoxyphenyl)-3-methyl-5-pyrazolone made by dissolving the latter in 100 parts of water containing sufficient sodium hydroxide to render the resulting solution just alkaline to Clayton Yellow and then adding 8 parts of soda ash. After stirring for 15 hours the dyestuff is filtered off and dried at 50° C. The new dyestuff dyes wool by the meta-chrome process in orange-brown shades. The dyeings possess excellent fastness to washing, milling, potting and light.

We claim:
A chromable monazo dye which in its acid form is represented by the formula

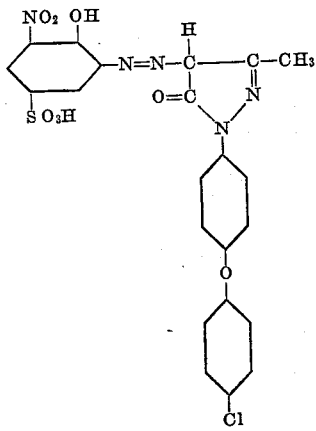

WALTER FRANCIS BEECH.
MORDECAI MENDOZA.

REFERENCES CITED

The following references are of record in the file of this patent:

UNITED STATES PATENTS

| Number | Name | Date |
| --- | --- | --- |
| 2,195,788 | Schmid | Apr. 2, 1940 |
| 2,195,787 | Schmid | Apr. 2, 1940 |
| 2,195,784 | Schmid | Apr. 2, 1940 |
| 2,155,001 | Schmid | Apr. 18, 1939 |
| 2,060,563 | Fischer | Nov. 10, 1936 |
| 2,009,611 | Fischer | July 30, 1935 |

FOREIGN PATENTS

| Number | Country | Date |
| --- | --- | --- |
| 779,126 | France | Jan. 10, 1935 |
| 650,766 | Germany | Sept. 30, 1937 |
| 187,603 | Switzerland | Feb. 1, 1937 |
| 652,869 | Germany | Nov. 10, 1937 |
| 189,049 | Switzerland | May 1, 1937 |
| 189,048 | Switzerland | May 11, 1937 |
| 444,820 | Great Britain | Mar. 27, 1936 |